United States Patent
Chen et al.

(10) Patent No.: US 12,361,000 B1
(45) Date of Patent: Jul. 15, 2025

(54) AUTOMATIC QUERY AND DATA RETRIEVAL OPTIMIZATION THROUGH PROCEDURAL GENERATION OF DATA TABLES FROM QUERY PATTERNS

(71) Applicant: PAYPAL, INC., San Jose, CA (US)

(72) Inventors: Chongchen Chen, Shanghai (CN); Si Feng, Shanghai (CN); Dawei Huang, Shanghai (CN)

(73) Assignee: PAYPAL, INC., San Jose, CA (US)

( * ) Notice: Subject to any disclaimer, the term of this patent is extended or adjusted under 35 U.S.C. 154(b) by 0 days.

(21) Appl. No.: 18/609,405

(22) Filed: Mar. 19, 2024

(51) Int. Cl.
G06F 16/2453 (2019.01)

(52) U.S. Cl.
CPC .............. G06F 16/24542 (2019.01)

(58) Field of Classification Search
CPC ................................................ G06F 16/24542
See application file for complete search history.

(56) References Cited

U.S. PATENT DOCUMENTS

| | | | | |
|---|---|---|---|---|
| 7,315,849 B2 * | 1/2008 | Bakalash | .......... | G06F 16/24539 707/999.005 |
| 7,333,982 B2 * | 2/2008 | Bakalash | .............. | G06F 16/283 707/999.005 |
| 7,392,248 B2 * | 6/2008 | Bakalash | .......... | C03B 37/02718 707/999.005 |
| 8,543,554 B1 * | 9/2013 | Singh | ................ | G06F 16/24552 707/706 |
| 9,342,557 B2 * | 5/2016 | Kornacker | ........ | G06F 16/24535 |
| 11,436,213 B1 * | 9/2022 | Waas | ....................... | G06F 40/30 |
| 12,013,853 B2 * | 6/2024 | Patel | ....................... | G06F 16/21 |
| 12,130,831 B2 * | 10/2024 | Zhan | ...................... | G06F 16/172 |
| 2002/0029207 A1 * | 3/2002 | Bakalash | ............... | G06F 16/283 |
| 2009/0216709 A1 * | 8/2009 | Cheng | ................. | G06F 16/2453 |
| 2012/0173519 A1 * | 7/2012 | Buessow | ........... | G06F 16/24539 707/E17.014 |
| 2014/0310470 A1 * | 10/2014 | Rash | ................... | G06F 12/0862 711/126 |
| 2015/0178277 A1 * | 6/2015 | Singhal | .................... | G06F 16/35 706/20 |
| 2015/0242464 A1 * | 8/2015 | Nguyen | .............. | G06F 16/2471 707/721 |
| 2017/0031980 A1 * | 2/2017 | Kamfonas | ......... | G06F 16/24556 |
| 2019/0220464 A1 * | 7/2019 | Butani | .................. | G06F 16/248 |

(Continued)

*Primary Examiner* — Jorge A Casanova
(74) *Attorney, Agent, or Firm* — Haynes and Boone, LLP (57) ABSTRACT

Latency, response times, and efficiency improvements for data querying are provided herein, particularly in the context of querying large database systems and data tables from disparate data sources. There are provided systems and methods for automatic query and data retrieval optimization through procedural generation of data tables from query patterns. A service provider may utilize different computing services for query processing and data retrieval for different applications and services used by internal and/or external users. Instead of querying large database systems and numerous data tables, pre-aggregated data tables may instead be used and searched by procedurally generating such tables based on precomputation rules and query patterns. Once patterns have been identified in queries, corresponding data may be aggregated from data sources in a pre-aggregated data table. Query optimization rules may then be used to have these data tables queried in place of their original sources.

20 Claims, 6 Drawing Sheets

(56) References Cited

U.S. PATENT DOCUMENTS

| | | | |
|---|---|---|---|
| 2020/0302080 A1* | 9/2020 | Strahan | G06F 16/24542 |
| 2021/0081434 A1* | 3/2021 | Dombroski | G06F 16/282 |
| 2022/0019539 A1* | 1/2022 | Amirishetty | G06F 12/0875 |

* cited by examiner

AUTOMATIC QUERY AND DATA RETRIEVAL OPTIMIZATION THROUGH PROCEDURAL GENERATION OF DATA TABLES FROM QUERY PATTERNS

TECHNICAL FIELD

The present application generally relates to database querying and data retrieval, and more particularly to optimizing data retrieval through procedural generation of pre-aggregated data tables with query optimization rules.

BACKGROUND

Users may utilize online service providers and corresponding computing systems and services to perform various computing operations and view available data. Generally, such computing operations are provided by online platforms and systems, which may provide applications and services for account establishment and access, messaging and communications, electronic transaction processing, and other types of available services. During performance of these operations, the service provider may utilize one or more applications to retrieve, process, and/or display data, which may include retrieving, processing, and displaying metrics to internal users, administrators, sales members, and the like. For example, internal dashboards may display various metrics about transactions and user behaviors, such as total transaction volume, number of transactions, and user growth rate across different regions and products over time.

However, retrieving and processing data in a production computing environment from big data sources may be slow, leading to long queue and response times. Slow query processing and responses to big data stores may also lead to failures or timeouts and inaccurate or unreliable data and computing services. To accelerate online queries, data engineers may build different pre-aggregated tables. However, manual generation of such data tables for faster query responses is slow, requires manual efforts, and leads to duplicated or similar data tables and/or tables having overlapping data and features. Further, data engineers may not know what data users may actually query, resulting in redundant pre-aggregated tables and impacting both query performance and storage size. Further, query patterns may change over time and data tables may not be optimized for changes in query patterns. Moreover, there is a need to ensure data consistency between different data sources when building data tables. As such, there exists a need for more reliable, automated, and faster creation of pre-aggregated tables that optimize query times and storage space.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods utilized for failure tracking with real-time data event streaming for data quality checks. Systems suitable for practicing methods of the present disclosure are also provided.

Service providers may receive, handle, and process data queries with big data stores and storage systems, such as large databases, cloud storage systems, data warehouses, and/or other data storage systems for large volumes of data. Such queries may return data to employees and/or other internal members of the service provider, as well as provide data to customers and third-party entities that use or rely on the service provider. Data may arrive over various types of data channels and queries systems, and may arrive via one or more applications, computing services, servers, or other endpoints. However, queries to big data storage systems may be slow and time consuming due to the large volume of data searches and size/number of data tables spread across different databases and storage components. In conventional systems, users may wait for data to be returned or data scientists may attempt to create smaller and more efficient data tables of pre-aggregated data for specific queries. However, these manual efforts have several disadvantages for responding to data queries and/or efficiently storing pre-aggregated and accurate data.

A service provider, such as an online transaction processor, may provide computing services to users and/or their corresponding entities, which may include end users and customers, merchant customers for an online transaction processor, businesses and their representatives and/or employees, and the like. In order for users to utilize computing service of a service provider, an online service provider (e.g., an online transaction processor, such as PAYPAL®) may provide account services to users of the online service provider, as well as other entities requesting the services. A user wishing to establish the account may first access the online service provider and request establishment of an account. An account and/or corresponding authentication information with a service provider may be established by providing account details, such as a login, password (or other authentication credential, such as a biometric fingerprint, retinal scan, etc.), and other account creation details. The account creation details may include identification information to establish the account, such as personal information for a user, business or merchant information for an entity, or other types of identification information including a name, address, and/or other information.

The user may also be required to provide financial information, including payment card (e.g., credit/debit card) information, bank account information, gift card information, benefits/incentives, and/or financial investments. This information may be used to process transactions for items and/or services and provide assistance to users with these payment instruments and/or payment processing. In some embodiments, the account creation may establish account funds and/or values, such as by transferring money into the account and/or establishing a credit limit and corresponding credit value that is available to the account and/or card. The online payment provider may provide digital wallet services, which may offer financial services to send, store, and receive money, process financial instruments, and/or provide transaction histories, including tokenization of digital wallet data for transaction processing. The application or website of the service provider, such as PAYPAL® or other online payment provider, may provide payments and other transaction processing services.

Once the account of a user is established with the service provider, the user may utilize the account via one or more computing devices, such as a personal computer, tablet computer, mobile smart phone, or the like. The user may engage in one or more online or virtual interactions that may be associated with electronic transaction processing, images, music, media content and/or streaming, video games, documents, social networking, media data sharing, microblogging, and the like. Similarly, the merchants may use the accounts when providing their merchant services to customers, such as during electronic transaction processing. All of this activity may generate data, which may be stored to big data storage and/or other database systems and data storage components that store large volumes of data.

To improve query response times and provide more efficient pre-aggregated data table creation and management, the service provider may provide a process and computing architecture to automatically pre-compute and auto-optimize data table creation of pre-aggregated data for user requests. The system and architecture may include a general query optimization system that can automatically pre-compute and generate optimal query plans and strategies. The system may also provide flexible configurations to allow data engineers to configure different optimization strategies for different environments, e.g., to optimize for performance versus storage. Additionally, the system may maintain a lineage between data sources to prevent data inconsistency.

As such, the service provider may provide an optimization rule configuration system that maintain rules for query optimization. Data engineers may configure optimization rules, which may include two or more different types of rules. For example, offline pre-computation rules may include rules for certain dimensions that may be queried together at or above a certain threshold rate and should have pre-aggregate tables built specifically for those dimensions. Online optimization rules may include rules for when two or more dimensions (e.g., dimensions A and B) have a one-to-many or one-to-one relationships, aggregation of data can be done on one first and then join the next after (e.g., aggregate data for dimension A first and B after) in a proceeding manner, thereby reducing shuffle costs by processing multiple dimensions at once. A data catalog system may be used to maintain relationships between tables from different sources and metadata for each table. For example, a data table from Apache® Druid data (or other big data source) may be a pre-aggregate of a Google® BigQuery data table, two BigQuery tables may be joined on a single column, and other relationships between big data sources and their pre-aggregated data tables that are created.

A query log analysis system may provide a system to process periodic jobs and analyze recent query patterns. This may be used to determine if these patterns match configured offline optimization rules, and, if matched, corresponding pre-computation jobs may be triggered. To generate pre-aggregated tables and process queries, the system and architecture may provide two further components. An offline pre-computation system may generate, such as periodically or continuously, pre-aggregated tables through offline analysis. The offline environment may correspond to a test or sandbox computing environment and may operate without being required to be "online" or connected to the Internet and/or other users or customers. However, the offline environment may also operate online and connected to the Internet or other network, but may instead correspond to a test environment instead of a live and/or production computing environment that may be utilized by customers and other end users of the service provider.

After pre-compute tables are built, their metadata may be added to the data catalog. With a unified schema management and explicit lineage, data inconsistency may be avoided compared to manual table generation. An online optimization system may provide optimal query plans for online queries by receiving a query, analyzing the query's pattern, matching the query against online optimization rules, and generating an execution plan to execute the query and search tables based on the matched rules. If no rules match, the original plan is used to query original data sources. Further, the system may persist query logs after each query. In this manner, the service provider may provide automated and optimized generation of pre-aggregated data tables for faster and more efficient query processing and responses.

In this manner, a service provider may provide automated and efficient optimization of query processing and response with faster data load times and lower processing requirements. This allows for faster, more efficient, and more coordinated data querying and provision by large data systems, components, devices, and the like, which may reduce and minimize the need to perform real-time querying of separate database, data stores, and/or distributed data storage components. Further, by optimizing local and/or cloud-based storage of pre-aggregated data tables, the number and amount of overlapping data and data tables generated by separate individuals may be reduced by having a system aware of the different available pre-aggregated data tables and data query parameters and dimensions that would be used to query such tables. This reduces wasted data storage and resource of unnecessary pre-aggregated data tables, as well as duplicate work aggregating data from data sources. This may better assist internal users, customers, data scientists, analysts, and the like in obtaining data in a timely and reliable manner. Thus, the service provider may provide more efficient and faster data querying and response systems.

Figure 1:
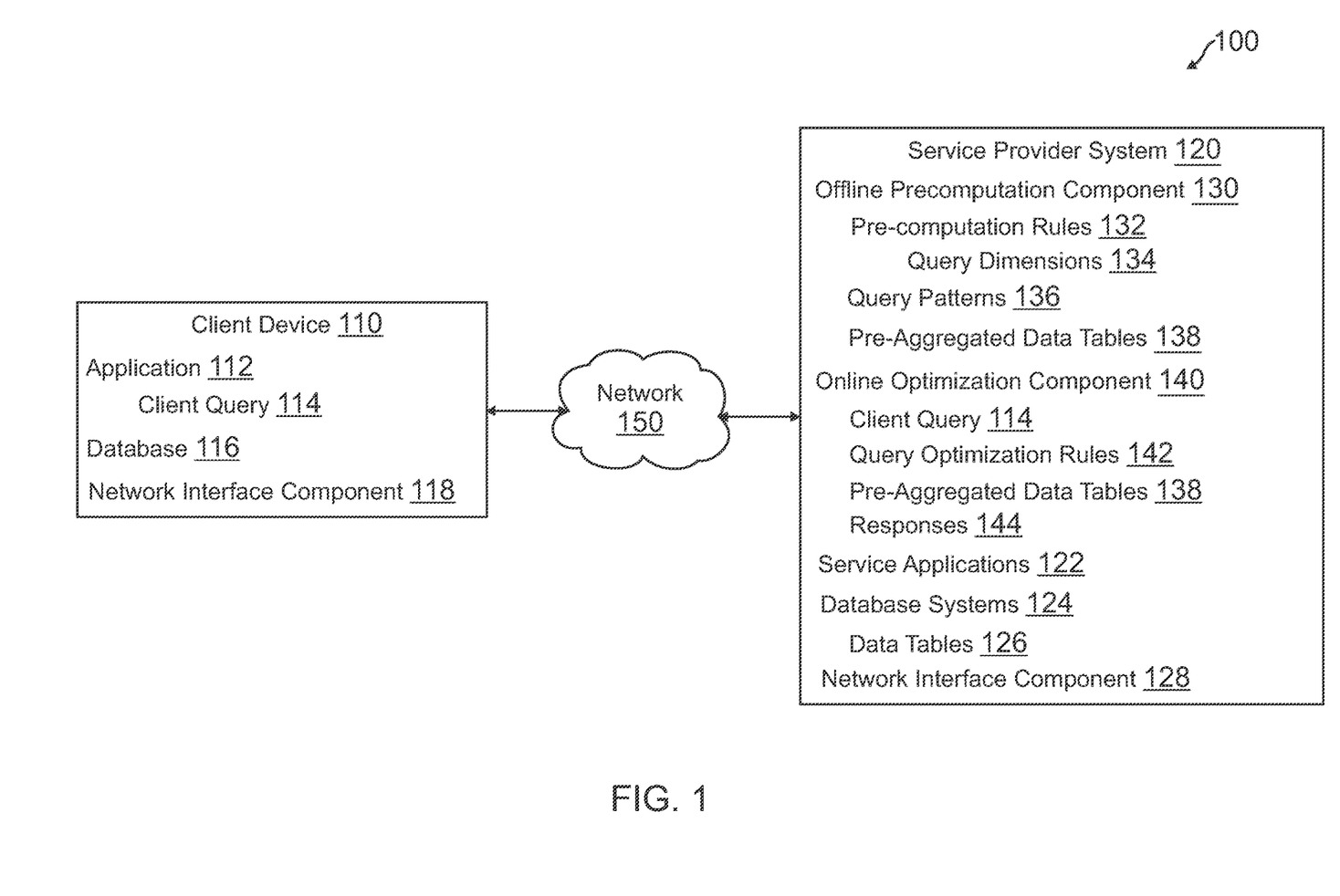
FIG. 1 is a block diagram of a networked system suitable for implementing the processes described herein, according to an embodiment.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or another suitable device and/or server-based OS. It can be appreciated that the devices and/or servers illustrated in FIG. 1 may be deployed in other ways and that the operations performed, and/or the services provided by such devices and/or servers may be combined or separated for a given embodiment and may be performed by a greater number or fewer number of devices and/or servers. One or more devices and/or servers may be operated and/or maintained by the same or different entity.

System 100 includes a client device 110 and a service provider system 120 in communication over a network 150. Client device 110 may be utilized by a user to access a computing service or resource provided by service provider system 120, where service provider system 120 may provide various data, operations, and other functions to client device 110 via network 150. As such, client device 110 may correspond to a device or endpoint of an internal user, agent, administrator, or the like of service provider system 120 that may request data from various databases and data storage components of service provider system 120, such as for analytics and/or internal metrics and the like. However, in other embodiments, client device 110 may be used by an external user, such as a customer, that may similarly request and view data from various databases and data storage components of service provider system 120. Service provider system 120 may process queries for data using query optimization rules that may allow for searching of pre-aggregated data tables created from query patterns and precomputation rules.

Client device 110 and service provider system 120 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 150.

Client device 110 may be implemented as a communication device that may utilize appropriate hardware and software configured for wired and/or wireless communication with service provider system 120 and/or other devices or servers. Client device 110 may be utilized, for example, by end users that may interact with service provider system 120 to query service provider system 120 for data. Client device 110 may be utilized by internal or external users to view metrics, analytics, or other aggregated data, such as through one or more dashboards or the like. In some embodiments, client device 110 may be implemented as a single or networked personal computers (PCs), servers, a smart phone, laptop computer, wearable computing device, and/or other types of computing devices. Although only one device is shown, a plurality of devices, clients, or other endpoints may function similarly.

Client device 110 of FIG. 1 contains an application 112, a database 116, and a network interface component 118. Application 112 may correspond to executable processes, procedures, and/or applications with associated hardware. In other embodiments, client device 110 may include additional or different modules having specialized hardware and/or software as required.

Application 112 may be utilized to request data from service provider system 120, such as by querying service provider system 120 for data and/or querying databases, data storage systems and/or components, cloud storage services, and the like via service provider system 120 for data. As such, application 112 may be used to request a set of data that may be used for analytics, review, processing, and the like, which may be presented directly and/or pre-aggregated into data views that may be digestible and/or usable for data review and analysis. Application 112 may transmit a client query 114 to service provider system 120 and receive a response in the form of output data via one or more user interfaces, dashboard, or other outputs of the returned data for a query. Service provider system 120 may provide query processing operations, which may perform query optimization and data searching using pre-aggregated data tables and query optimization rules. Client query 114 may include different dimensions, which correspond to the terms or other parameters used for database searching. For example, client query 114 may include two or more dimensions, which may be matched to query optimization rules, and data returned. As such, data may be returned to application 112 for client query 114 based on pre-aggregated data in a faster and more efficient manner, as discussed herein.

Application 112 may correspond to a general browser application configured to retrieve, present, and communicate information over the Internet (e.g., utilize resources on the World Wide Web) or a private network. For example, application 112 may provide a web browser, which may send and receive information over network 150, including retrieving website information, presenting the website information to the user, and/or communicating information to the website. However, in other examples, application 112 may include a dedicated application of service provider system 120 or other entity. Different services may be provided via application 112, including social networking, media posting or sharing, microblogging, data browsing and searching, online shopping, and other services available through service provider system 120. Thus, application 112 may also correspond to different service applications and the like.

Client device 110 includes other applications as may be desired to provide features to client device 110. For example, these other applications may include security applications for implementing client-side security features, programmatic client applications for interfacing with appropriate application programming interfaces (APIs) over network 150, or other types of applications. Other applications on client device 110 may also include email, texting, voice and IM applications that allow a user to send and receive emails, calls, texts, and other notifications through network 150. In various embodiments, the other applications may include financial applications, such as banking applications. Other applications may include social networking applications, media viewing, and/or other merchant or user available applications.

The other applications may also include location detection applications, which may be used to determine a location for the user, such as a mapping, compass, and/or GPS application, which can include a specialized GPS receiver that determines location information for client device 110. The other applications may include device interface applications and other display modules that may receive input from the user and/or output information to the user. For example, client device 110 may contain software programs, executable by a processor, including a graphical user interface (GUI) configured to provide an interface to the user. The other applications may use devices of client device 110, such as display devices capable of displaying information to users and other output devices, including speakers.

Client device 110 may further include database 116 stored on a transitory and/or non-transitory memory of client device 110, which may store various applications and data and be utilized during execution of various modules of client device 110. Database 116 may include, for example, identifiers such as operating system registry entries, cookies associated with application 112 and/or other applications 114, identifiers associated with hardware of client device 110, or other appropriate identifiers, such as identifiers used for payment/user/device authentication or identification, which may be communicated as identifying the user/client device 110 to service provider system 120.

Client device 110 includes at least one network interface component 118 adapted to communicate with service provider system 120 and/or another device or server. Network interface component 118 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Service provider system 120 may be maintained, for example, by an online service provider, which may provide computing services that utilize and/or provide event data from real-time event data processing. In this regard, service provider system 120 includes one or more processing applications which may be configured to interact with client device 110 and/or other devices, servers, and/or components for data processing and/or data retrieval from query requests. In one example, service provider system 120 may be provided by PAYPAL®, Inc. of San Jose, CA, USA. However, service provider system 120 may be maintained by or include another type of service provider.

Service provider system 120 of FIG. 1 includes an offline pre-computation component 130, an online optimization component 140, service applications 122, database systems 124, and a network interface component 128. Offline pre-computation component 130, online optimization component 140, and service applications 122 may correspond to executable processes, procedures, and/or applications with associated hardware. In other embodiments, service provider system 120 may include additional or different modules having specialized hardware and/or software as required.

Offline pre-computation component 130 may correspond to a digital platform, software application and/or application architecture or the like, which may be in an offline computing environment, that may include one or more processes that execute modules and associated specialized hardware of service provider system 120 to precompute likely queries and/or query patterns having different dimensions (e.g., multi-fact querying by allowing queries to have different values or parameters for searching, such as a category and name (e.g., "customer" and "Alice"). In this regard, offline pre-computation component 130 may correspond to specialized hardware and/or software that may utilize precomputation rules 132 for query dimensions 134 to process query patterns 136 and identify those query patterns meeting a threshold or other metric designating sufficient querying for corresponding data. Once identified as sufficiently occurring and/or being of sufficient importance, the data may be aggregated in pre-aggregated data tables 138 instead of performing database searches and lookups.

In this regard, precomputation rules 132 may correspond to a set of business rules or other executable computing rules that may be used by a rule-based or other intelligent computational engine to identify data for pre-aggregation in pre-aggregated data tables 138. In this regard, query dimensions 134 may be utilized to analyze query patterns 136 from queries to internal and/or external databases and data storage components or systems (e.g., Apache® Druid, Google® BigQuery, Amazon® Cloud storage on AWS, etc.). Such queries may take significant time to search and resolve, which cause latency issues, lag, failure to load, poor customer engagement, bad or late data, and the like. As such, when query patterns 136 indicate a query including one or more of query dimensions 134 occurs to a sufficient threshold (e.g., meeting or exceeding a number of times, times per time unit (e.g., 500 times in an hour), etc.), then the data may be designated to be stored in pre-aggregated data tables 138 by retrieving the tables and constructing or generating a data table in local storage (e.g., a local cache or other quick access storage), which may allow faster retrieval through a small data table and more local storage, thereby reducing search costs and times to search large and/or remote database systems. Thresholds for occurrence of query dimensions 134 may be set and/or changed by an administrator, system designer, data scientist, or the like, who may determine and modify thresholds depending on the system designs and desired triggers for data table generation. However, in other embodiments, the thresholds may be intelligently determined and modified by an AI system and/or model, which may Further, when constructing pre-aggregated data tables 138, offline pre-computation component 130 may further generate query optimization rules 142, which may match and/or correlate incoming queries with data in pre-aggregated data tables 138 instead of or in place of performing database querying to remote database systems, such as based on query dimensions 134 for such queries. As such, query optimization rules 142 may include query dimensions that may occur together or be linked such that when two or more query dimensions are detected in an incoming query, a corresponding lookup in pre-aggregated data tables 138 may be performed without or independent of querying corresponding databases and data storage systems. Generation of precomputation rules 132 and/or query optimization rules 142 may be performed manually by a rule writer, data scientist, analyst, or other system user. However, in other embodiments, generation of precomputation rules 132 and/or query optimization rules 142 may occur through intelligent generation by one or more artificial intelligent (AI) engines, such as using a neural network (NN) or machine learning (ML) model. In such embodiments, analysis of query patterns 136 and other data associated with queries and/or aggregated data for rules that may be utilized to determine what data is or should be aggregated, as well as how and when to search for such data when queries are received.

Thus, online optimization component 140 may correspond to a digital platform, software application and/or application architecture, or the like, which may be in an online or production computing environment, that may include one or more processes that execute modules and associated specialized hardware of service provider system 120 to receive incoming queries and process such queries using query optimization rules 142 to return responses 144 from pre-aggregated data tables 138. In this regard, service applications 122 may correspond to specialized hardware and/or software that may determine matching or correlated rules from query optimization rules 142 when a query is received, such as client query 114, and perform a data search or lookup in pre-aggregated data tables 138 in a faster and more efficient manner in place of searching a database system. Correlation of client query 114 to query optimization rules 142 may be based on query dimensions 134, such as two or more dimensions found in client query 114 that match a corresponding rule to search pre-aggregated data tables 138. Thus, the dimensions may be used to then search pre-aggregated data tables 138 based on client query 114 and obtain one of responses 144, which is then provided to client device 110. The operations and components to perform query optimization through pre-aggregated data tables that are procedurally computed from rules and query patterns, are described in further detail below with regard to FIGS. 2-4B.

In some embodiments, offline pre-computation component 130 and/or online optimization component 140 may utilize an AI model and/or engine, such as one or more AI or ML models, NNs, generative AIs, or the like to generate precomputation rules and/or query optimization rules, respectively, as well as perform other intelligent decision-making for query optimization using pre-aggregated data tables. These models and/or networks may have trained layers based on training data and selected ML features or variables. For example, ML features or variables may correspond to individual pieces, properties, characteristics, or other inputs for an ML model and may be used to cause an output by that ML model once the ML model has been trained using data for those features from training data. ML models may be used for computation and calculation of model scores based on ML layers that are trained and optimized. As such, ML models may be trained to provide a predictive output, such as a score, likelihood, probability, or decision, associated with a particular prediction, classification, or categorization.

For example, ML models and/or NNs may include deep NNs (DNNs), MLS, large language models (LLMs), generative AI models, or other AI models trained using training data having data records that have columns or other data representations and stored data values (e.g., in rows for the data tables having feature columns) for the features. When building ML models and/or NNs, training data may be used to generate one or more classifiers and provide recommendations, predictions, or other outputs based on those classifications and an ML or NN model algorithm and architecture. The algorithm and architecture for the ML models and/or NNs may correspond to DNNs, ML decision trees and/or clustering, conversational AI models, LLMs, generative AI, and other types of AI, ML, and/or NN architectures. The training data may be used to determine features, such as through feature extraction and feature selection using the input training data. For example, DNN models may include one or more trained layers, including an input layer, a hidden layer, and an output layer having one or more nodes; however, different layers may also be utilized. As many hidden layers as necessary or appropriate may be utilized, and the hidden layers may include one or more layers used to generate vectors or embeddings used as inputs to other layers and/or models. In some embodiments, each node within a layer may be connected to a node within an adjacent layer, where a set of input values may be used to generate one or more output values or classifications. Within the input layer, each node may correspond to a distinct attribute or input data type for features or variables that may be used for training and intelligent outputs, for example, using feature or attribute extraction with the training data.

Thereafter, the hidden layer(s) may be trained with this data and data attributes, as well as corresponding weights, activation functions, and the like using a DNN algorithm, computation, and/or technique. For example, each of the nodes in the hidden layer generates a representation, which may include a mathematical computation (or algorithm) that produces a value based on the input values of the input nodes. The DNN, ML, or other AI architecture and/or algorithm may assign different weights to each of the data values received from the input nodes. The hidden layer nodes may include different algorithms and/or different weights assigned to the input data and may produce a different value based on the input values. The values generated by the hidden layer nodes may be used by the output layer node(s) to produce one or more output values for ML models that attempt to classify and/or categorize the input feature data and/or data records. Thus, when the ML models and/or NNs are used to perform a predictive analysis and output, the input data may provide a corresponding output based on the trained classifications.

By providing training data, the nodes in the hidden layer may be trained (adjusted) such that an optimal output (e.g., a classification) is produced in the output layer based on the training data. By continuously providing different sets of training data and/or penalizing the ML models and/or NNs when the outputs are incorrect, the ML models and/or NNs (and specifically, the representations of the nodes in the hidden layer) may be trained (adjusted) to improve its performance in data classifications and predictions. Adjusting of the ML models and/or NNs may include adjusting the weights associated with each node in the hidden layer.

Service applications 122 may correspond to one or more processes to execute modules and associated specialized hardware of service provider system 120 to provide computing services for account usage, digital electronic communications, electronic transaction processing, and the like. In this regard, service applications 122 may correspond to specialized hardware and/or software used by service provider system 120 to provide, such as to a user associated with client device 110 and/or other internal/external users, one or more computing services. Service applications 122 may correspond to electronic transaction processing, account, messaging, social networking, media posting or sharing, microblogging, data browsing and searching, online shopping, and other services available through service provider system 120. Service applications 122 may be used by a user to establish an account and/or digital wallet, which may be accessible through one or more user interfaces, as well as view data and otherwise interact with the computing services of service provider system 120. In various embodiments, financial information may be stored to the account, such as account/card numbers and information. A digital token or other account for the account/wallet may be used to send and process payments, for example, through an interface provided by service provider system 120. The payment account may be accessed and/or used through a browser application and/or dedicated payment application, which may provide user interfaces for use of the computing services of service applications 122.

The computing services may be accessed and/or used through a browser application and/or dedicated payment application, such as application 112 that displays UIs from service provider system 120. In some embodiments, such computing services may be associated with querying and viewing data, and as such, service applications 122 may include query processing applications, database searching applications, and the like, which may function with offline pre-computation component 130 and/or online optimization component 140 to return data. Service applications 122 may provide one or more user interfaces, dashboards, or the like, which may be used to view data responsive to queries, as well as interact with the data and/or request data retrieval for data in a pre-aggregated table from the original source of the data.

Additionally, service provider system 120 includes database systems 124. Database systems 124 may store various identifiers associated with client device 110. Database systems 124 may also store account data, including payment instruments and authentication credentials, as well as transaction processing histories and data for processed transactions. Database systems 124 may store financial information and tokenization data. Database systems 124 may further include data tables 126, such as a database with a map or associative array that associates each "key" or identifier for a query dimension with a corresponding value or data, in a data structure (e.g., a table). As such, database systems 124 may include pre-aggregated data in data tables 126 from one or more data sources, such as separate database systems and components.

Service provider system 120 may include at least one network interface component 128 adapted to communicate client device 110 and/or other devices and servers over network 150. In various embodiments, network interface component 128 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 150 may be implemented as a single network or a combination of multiple networks. For example, network 150 may include the Internet or one or more intranets, landline networks, wireless networks, and/or other appropriate types of networks. Thus, network 150 may correspond to small scale communication networks, such as a private or local area network, or a larger scale network, such as a wide area network or the Internet, accessible by the various components of system 100.

Figure 2:
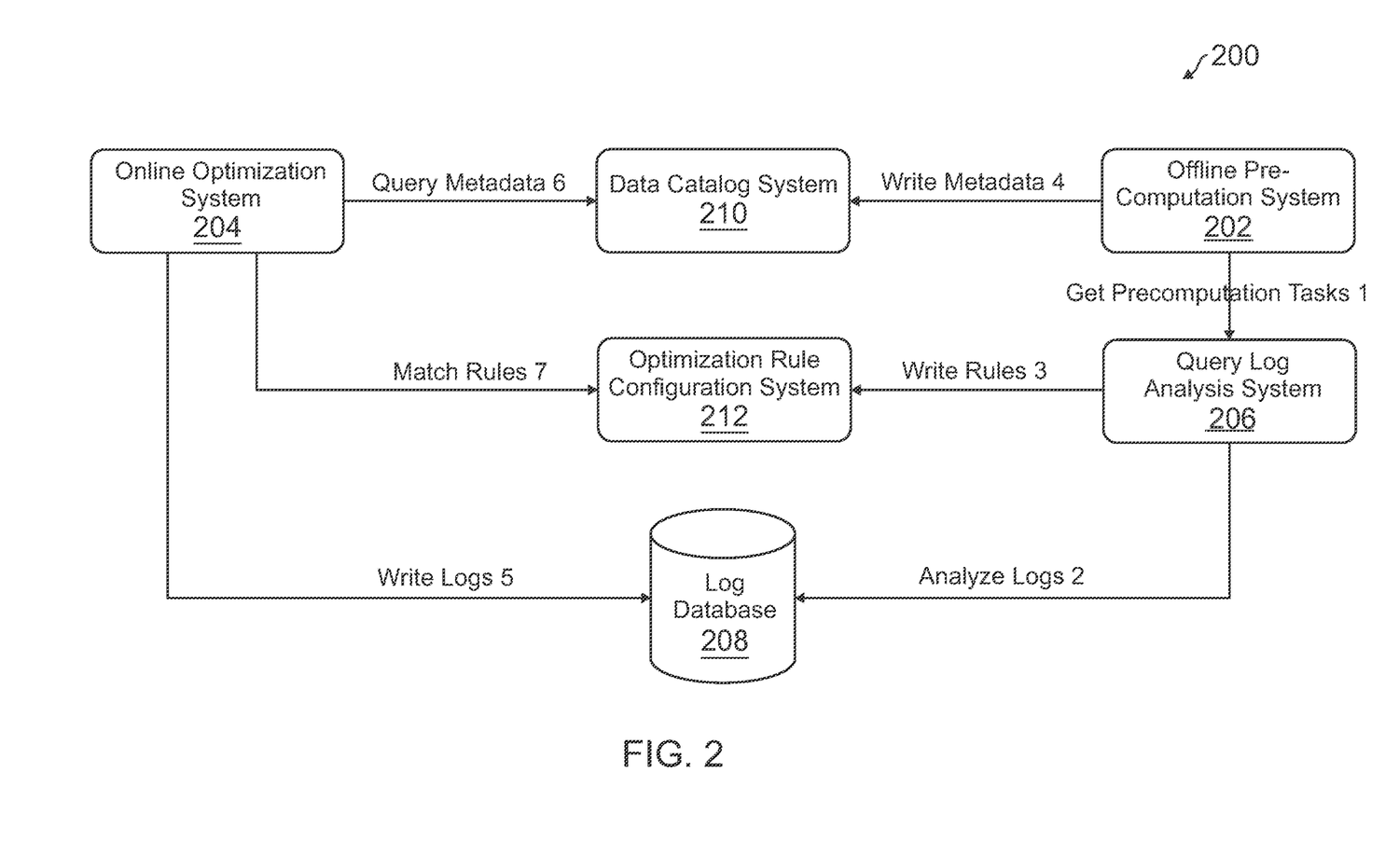
FIG. 2 is an exemplary diagram where an offline precomputation system and an online optimization system may interact to perform query optimization using pre-aggregated data tables, according to an embodiment.

FIG. 2 is an exemplary diagram 200 where an offline pre-computation system and an online optimization system may interact to perform query optimization using pre-aggregated data tables, according to an embodiment. Diagram 200 includes an offline pre-computation system 202 and an online optimization system 204 depicted in FIG. 2 that may provide query optimization through procedural generation of pre-aggregated data tables, as discussed with regard to offline precomputations component 130 and online optimization component 140 of service provider system 120 in system 100 of FIG. 1. As such, offline pre-computation system 202 and online optimization system 204 may include internal systems, components, applications, servers, processing stacks, APIs, and the like that may interact to assist a service provider with query optimization.

Interactions 1-7 in FIG. 2 show an exemplary processing flow from initial data aggregations based on query patterns to query optimization using data tables resulting from such data aggregations. Offline precomputation system 202 may correspond to one or more processing systems and/or components that may identify tasks and jobs for data aggregation of data from disparate data sources in a predictive manner prior to receiving one or more queries for such data, thereby allowing for the data to be retrieved and returned in a faster and more efficient manner during real-time query processing. To do so, offline precomputation system 202, during an interaction 1, obtains or accesses precomputation tasks for processing query logs from a query log analysis system 206, which is used to determine if query patterns meet or exceed a threshold for a data aggregation task. Precomputation tasks may be those computing tasks or jobs that may monitor different communication channels and database querying system(s) for request data from data tables and/or databases, as well as preprocess data for query logs for pattern identification. In this regard, query log analysis system 206 may analyze logs from a log database that stores historical data for different queries and computing logs associated with the queries (e.g., network traffic logs, querying/database search logs, etc.).

At an interaction 2, query log analysis system 206 may determine query patterns based on query logs, which may correspond to the same or similar query requested by clients. The query patterns may further be based on a time period over which the queries are analyzed, and may also be grouped by this time period, dimensions to the queries (e.g., different parameters or features to be queried, including the values or data pieces to be queried from a data table). Using precomputation rules, offline computation system 202 and query log analysis system 206 may, during interaction 2, determine if any of these query patterns meet or exceed a threshold, thereby indicating that data for those queries should be aggregated and a query optimization rule written for querying a pre-aggregated data table in place of querying the original data sources, which may take more time and computing resources, while being less efficient. Pattern identification may occur when a sufficient number of queries, data requests, or the like occur as much or more than a threshold, which may be manually set by an administrator, data scientist, or other end user, or programmatically and/or intelligent by an AI engine or model configured to select threshold of pattern identified.

As such, if one or more query patterns are identified by corresponding precomputation rule(s) as meeting or exceeding their threshold (e.g., queries having two or more specific dimensions occur X number of times over Y hours), then the data may be aggregated and a query optimization rule may be written, at an interaction 3, by query log analysis system 206 to an optimization rule configuration system 212. The rule written for query optimization to optimization rule configuration system 212 may be used to identify other matching or correlated queries, which then can be searched using the pre-aggregated data from the query pattern analysis and data aggregation previously performed. As such, query optimization rules implemented with optimization rule configuration system 212 may be used to optimize queries by having systems search and lookup data in pre-aggregated data tables from offline precomputation system 202 and query log analysis system 204 interactions in place of and/or independent of querying the original data sources, such as large database systems and/or data tables that may lead to slow response times and inefficient data retrieval and loading. During an interaction 4, metadata indicating the pre-aggregated data tables and the data stored to such data tables in written to a data catalog system 210, which may perform operations to track different pre-aggregated data tables, allow for searching, retrieval, processing, updating, and/or deleting of such tables, and the like. Data catalog system 210 may include records for the available pre-aggregated data, which may also include tags or identifiers for dimensions that may be used to query searching and data retrieval.

Thereafter, during runtime and/or in a live production computing environment, online optimization system 204 may interact with log database 208, data catalog system 210, and optimization rule configuration system 212 in order to perform query optimization using pre-aggregated data tables. During an interaction 5, when queries are received, query logs are written to log database 208. This allows for further query pattern analysis and determination of data aggregations for pre-aggregated data table generation and/or updating by offline precomputation system 202 and/or query log analysis system 206.

At an interaction 6, when a query is received, for optimization query metadata is used with data catalog system 210 to determine query information necessary for query optimization. This may include identifying the dimensions to the query, as well as identifying the data tables and data sources that the query is to be operated on in order to retrieve corresponding data. Data catalog system 210 may include metadata for pre-aggregated data tables, including query dimensions, data values and/or parameters, and corresponding links or other source information for the data source(s) storing the data in the pre-aggregated data tables. Once query information is determined, at an interaction 7, the query is matched to query optimization rules with optimization rule configuration system 212. Matching may include correlating the query with one or more rules based on the dimensions that match or are correlated between the query and rules. As such, two or more dimensions may be identified that limit the query to being correlated with one or more rules, which allow for searching of corresponding pre-aggregated data tables for those rules for the data that is responsive to the query. This may be done in place of querying the data sources to reduce system resources used, latency, and time, thereby providing a more efficient query response and data search system.

Figure 3:
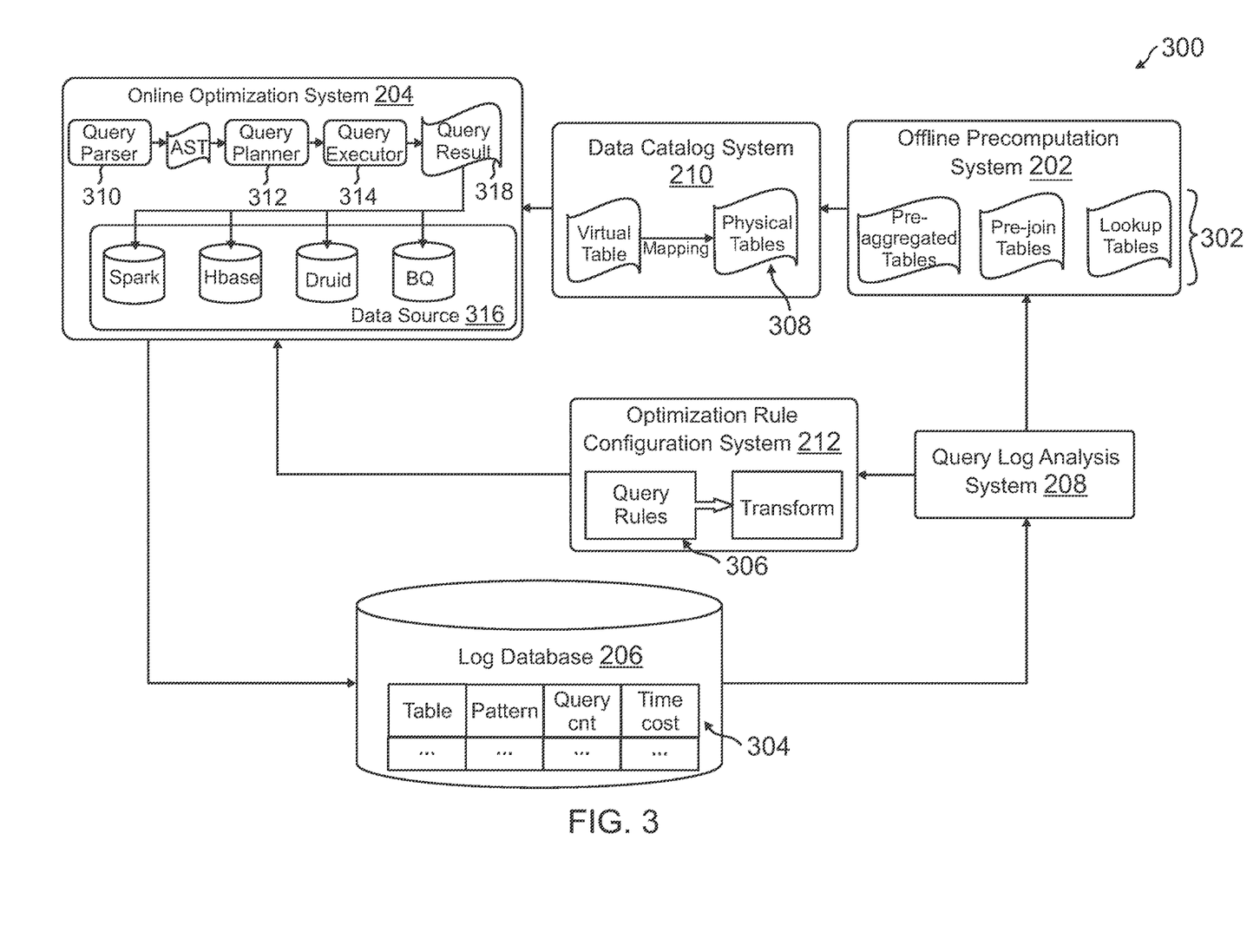
FIG. 3 is an exemplary system environment of offline and online components for precomputation of data aggregations and real-time query optimization, according to an embodiment.

FIG. 3 is an exemplary system environment 300 of offline and online components for precomputation of data aggregations and real-time query optimization, according to an embodiment. System environment 300 of FIG. 3 displays an environment in which offline pre-computation system 202 and online optimization system 204, discussed in reference to diagram 200 of FIG. 2, may interact to provide query optimization, as discussed herein. In this regard, offline pre-computation system 202 and online optimization system 204 may perform procedural generation of pre-aggregated data tables and utilize such tables for query optimization in real-time for query processing systems.

In system environment 300, the components in diagram 200 of FIG. 2 are shown in further detail with their corresponding operations and/or data for query optimization. For example, offline precomputation system 202 may correspond to the initial system that triggers data aggregation performed in a procedural manner based on precomputation rules for data aggregation and corresponding query patterns. In this regard, offline precomputation system 202 may generate data tables 302 by interacting with query log analysis system 206 (and log database 208 by proxy via query log analysis system) in order to create different ones of data tables 302 including pre-aggregated tables, pre-join tables for data prior to being joined to other tables (e.g., data retrieved and to be aggregated or added to already aggregated data in tables), and/or lookup tables that may be used to link to and/or retrieve data in pre-aggregated tables from their original data sources (e.g., large database systems and/or large data tables residing in other storage components and systems).

For example, data tables 302 may be generated through analysis of query logs 304 from log database 208 using query log analysis system 206. Query log analysis system 206 may collect and process query logs 304 in order to determine query patterns used for matching to and/or correlating with precomputation rules for precomputation of data aggregations and generation of pre-aggregated data tables. As such, query logs 304 may be batched and processed to identify patterns of queries. For example, a query pattern may be a top-N type query, such as a query for the top 10 senders of funds in a recent time period. The query pattern may also correspond to other queries that have multiple dimensions and are repeatedly queried over a time period, such as the average amount of funds sent, the origination and/or destination location for sender/receiver users or accounts in transactions, etc. Query patterns may then be processed and matched or correlated with rules that may correspond to precomputation rules transformed at 306 (e.g., by transforming an abstract syntax tree (AST) or other abstract representation of code and/or syntactic structure for queries and query dimensions in such rules) for identification of query patterns that meet or exceed a threshold rate of occurrence, use, resource usage, or the like. For example, a rule may be that if a query pattern has X dimension and occurs with Y dimension, aggregate to a data table with other matching data for different values of X and/or Y.

Thereafter, rules 306 may then be used for construction of data tables 302. Once generated, rules 306 may also be updated with further query optimization rules that are written for identifying queries that may instead be used with pre-aggregated tables from data tables 302. These rules may be written to optimization rule configuration system 212 that enables online optimization system 204 to perform query optimization. As such, optimization rule configuration system 212 may be used for writing query optimization rules, for example, to optimize queries, and may also be used to write, update, and further configure precomputation rules based on new observations and/or learning from query patterns from query logs 304. This may include using a NN, ML model, or other AI engine or system to predict and/or classify particular query patterns for data aggregation and query optimization when processing new query logs and changing data. For example, clustering algorithms and/or ML algorithms for classification (e.g., decision trees and the like) may be used to predicting and/or classifying query patterns, such as models for pattern recognition (e.g., statistical syntactic, and/or neural pattern recognition). Further, to provide for retrieval of virtualized and/or aggregated data in data tables 302, data catalog system 210 may include mappings 308 of virtual tables (e.g., pre-aggregated data tables) to physical tables (e.g., data tables in BigQuery or Druid) so that original sources of data may be queried, and original data retrieved and examined, including other associated data records.

Online optimization system 204 may include components and processes for query optimization using the rules from optimization rule configuration system 212 and incoming queries from one or more clients. In this regard, online optimization system 204 includes a query parser 310 that may parse and transform queries to an AST representing the code and/or syntactic structure of the queries, which may be used to respond to such query by analyzing the dimensions of the query. In this regard, the AST of the query may be provided by query parser 310 to a query planner 312, which may plan a querying and searching plan or steps to determine if the query may be performed using pre-aggregated data. As such, query planner 312 may analyze the dimensions to the query using one or more query optimization rules, and may determine steps to query pre-aggregated data tables, as well as the corresponding data sources when required. A query executor 314 may then execute the query plan for the query using data sources 316 and/or pre-aggregated data from data tables 302, which may return a result 318. Result 318 may then be output to the client requesting the query of data tables 302 and/or data sources 316.

Figure 4A:
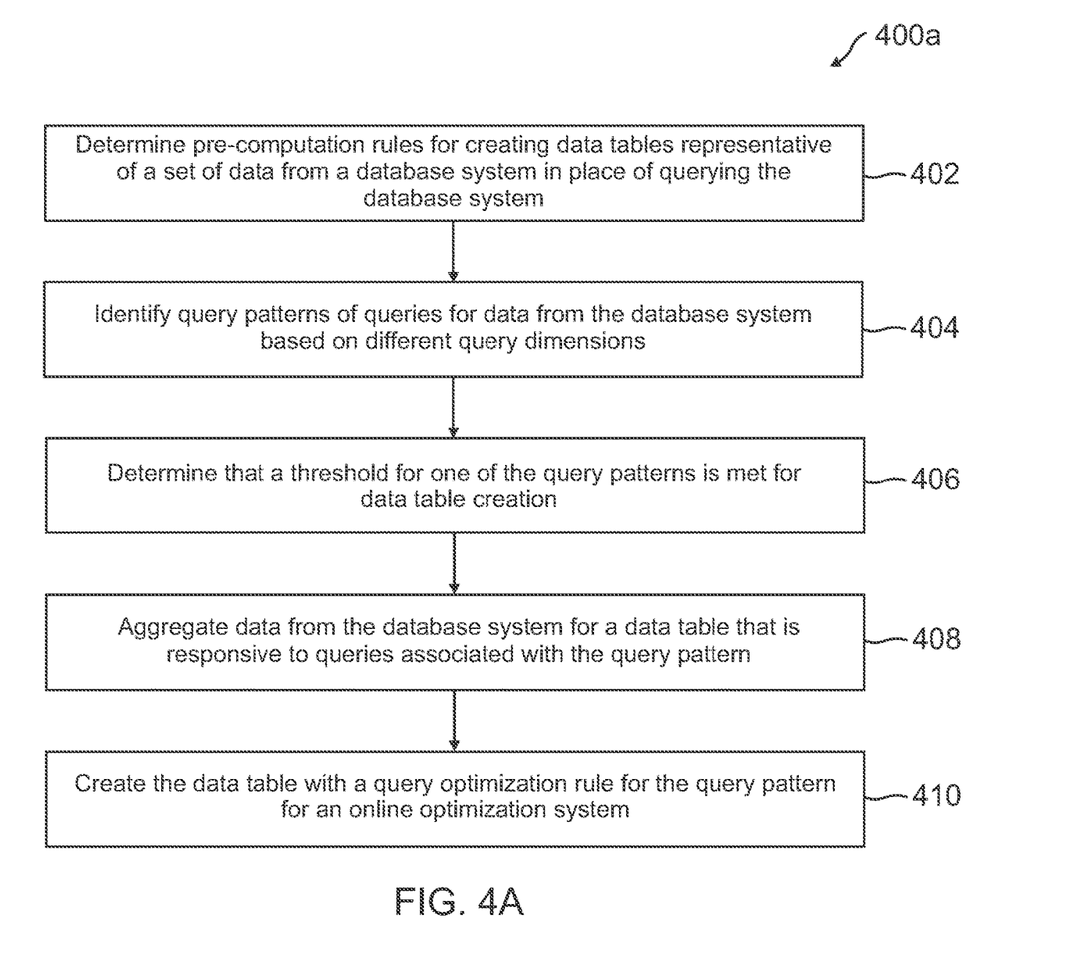
FIG. 4A is a flowchart of an exemplary process for offline precomputation of pre-aggregated data tables using precomputation rules and query patterns, according to an embodiment.

FIG. 4A is a flowchart 400a of an exemplary process for offline precomputation of pre-aggregated data tables using precomputation rules and query patterns, according to an embodiment. Note that one or more steps, processes, and methods described herein of flowchart 400a may be omitted, performed in a different sequence, or combined as desired or appropriate.

Flowchart 400a in FIG. 4A includes steps executed by service provider system 120 for pre-aggregating data in one or more tables, such as using offline precomputation component 130 when using precomputation rules to aggregate data prior to being queried for such data by client device 110 based on query patterns. As such, different portions of the steps of flowchart 400a are shown as being performed by, on, or with offline precomputation component 130, which may also include use of internal or external databases and other data sources. At step 402 of flowchart 400a, precomputation rules for creating data tables representative of a set of data from a database system in place of querying the database system are determined. The precomputation rules may be accessed from a database or system that may perform offline precomputation of data aggregations to perform based on query patterns. As such, the precomputation rules may be associated with a domain, task, set of queries, corresponding data and/or type of data, database systems, and the like.

In this regard, precomputation rules may be generated and provided to the system by a rule writer, data scientist, analyst, or the like based on desired query patterns to detect and data aggregations to perform. However, in other embodiments, the precomputation rules may be procedurally generated by an intelligent system based on current data aggregations, goals for data aggregations, and/or query patterns and retrieved/returned data that was queried (e.g., common queries, commonly searched and/or retrieved data, data that may take a long time or be inefficient and/or costly to retrieve, etc.). The precomputation rules may each identify and/or designate particular query dimensions for query pattern detection and analysis, as well as a threshold occurrence and/or rate of such dimensions and queries that would trigger a data aggregation task to be performed for creating a pre-aggregated data table and/or adding data to a table, as well as one or more queries optimization rules for optimizing queries for that data when received.

At step 404, query patterns of queries for data from the database system are identified based on different query dimensions. The query patterns may correspond to different queries, in natural language and/or a query language/syntax, that may be received over a period of time and used to identify when particular data is being searched, requested, and/or retrieved from larger database systems and/or data tables, thereby creating inefficiencies and/or time delays in returning data to clients that is responsive to such queries. As such, the query patterns may include corresponding dimensions used for data searching and querying from database systems, which may then be matched and/or correlated to the precomputation rules to identify when particular data should be aggregated for those queries in order to more quickly and efficiently retrieve and return data to the queries.

At step 406, it is determined that a threshold for one of the query patterns is met for data table creation. Using the precomputation rules and query dimensions to be matched or correlated to queries in a batch or set of queries over time, patterns for subsets of such queries may be identified as occurring to a certain threshold, such as a certain number in a period of time. Thus, when a sufficient number, amount, or other metric of queries are identified as meeting or exceeding such threshold associated with one or more precomputation rules, a job or task may be triggered to aggregate the corresponding data to be retrieved for those queries from one or more database systems or tables for pre-aggregated data table creation.

At step 408, data from the database system for a data table that is responsive to queries associated with the query pattern is aggregated. As discussed above, an executable job may be triggered to aggregate the data, and as such, one or more API calls and/or queries may be performed to the corresponding database systems to retrieve the data for pre-aggregation. The data may be retrieved based on automatically generated database queries corresponding to the database systems and/or tables storing the data, or may be retrieved from data returned to other clients for the queries that triggered the job. At step 410, the data table is created with a query optimization rule for the query pattern for an online optimization system. Once the data have been retrieved, the data may then be aggregated in a data table. The data table may include rows for individual data records, as well as columns associated with the dimensions for the queries. As such, query optimization rules may also be generated and/or configured to route queries or perform querying using the pre-aggregated data table in place of or without querying, the larger database system(s) and/or data table(s), thereby optimizing query response times, resource usage, and efficiency by using a smaller data table and less processing resources/time. For example, the query optimization rules may include two or more dimensions, which, when detected in a query, may cause the service provider's query response system to instead query and lookup the data using the pre-aggregated data table.

An exemplary process for implementing flowchart 400a may include determining one or more precomputation rules for creating a data table representative of a set of data from a database system that is responsive to a plurality of queries having at least two dimensions queried together in the plurality of queries, accessing query patterns for the database system for the at least two dimensions, determining that the query patterns include a threshold number of queries matching the one or more precomputation rules, aggregating the set of data that is responsive to the plurality of queries having the at least two dimensions, creating the data table for the set of data from the database system, wherein the data table is created with metadata for the data table that is used to query the data table and the database system based on the one or more precomputation rules and one or more query optimization rules for querying the data table using the at least two dimensions.

In various embodiments, the process may further include adding a relationship between the data table and one or more sources of the set of data from the database system to a data catalog, wherein the relationship includes metadata indicating content of the set of data in the data table, the one or more sources, and the at least two dimensions for the plurality of queries corresponding to the data table. The process may also include analyzing the query patterns using a periodic job of a query log analysis system and maintaining the data catalog having a plurality of relationships including the relationship, wherein the data catalog enables linking to the database system for additional data associated with the set of data after querying the data table. Further, the one or more precomputation rules may be established for an offline aggregation of the set of data from the database system comprising a plurality of separate data storages each having a separate query structure and a separate storage format, and the one or more query optimization rules may be established for online optimization of at least query response times using at least the data table independent of querying each of the plurality of separate data storages.

Figure 4B:
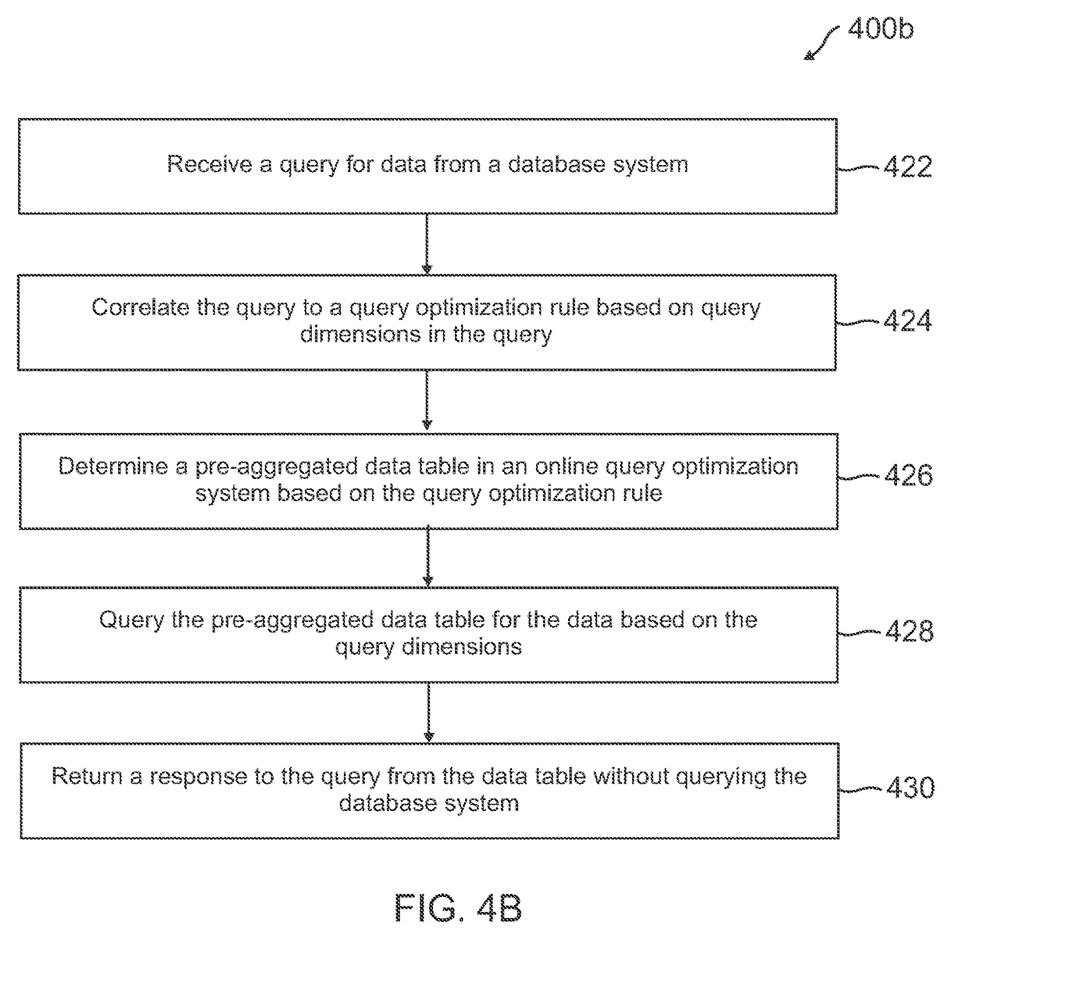
FIG. 4B is a flowchart of an exemplary process for online query optimization using query optimization rules and pre-aggregated data tables for different query dimensions, according to an embodiment.

FIG. 4B is a flowchart 400b of an exemplary process for online query optimization using query optimization rules and pre-aggregated data tables for different query dimensions, according to an embodiment. Note that one or more steps, processes, and methods described herein of flowchart 400b may be omitted, performed in a different sequence, or combined as desired or appropriate.

Flowchart 400b in FIG. 4B includes steps executed by service provider system 120 with client device 110, such as using online optimization component 140 when optimizing query processing and data searching using pre-aggregated data tables and query optimization rules. As such, different portions of the steps of flowchart 400b are shown as being performed by, on, or with online optimization component 140 when providing data to client device 110. At step 422 of flowchart 400b, a query for data from a database system is received. The query may be received from a client, where the client may request data from a data source. Conventionally, the data sources may be queried; however, using the pre-aggregated data table created or updated as discussed above with regard to FIG. 4A, the pre-aggregated data table may instead be searched and/or queried for data lookup. As such, the dimensions of the incoming query may be identified and analyzed for query optimization using query optimization rules for pre-aggregated data tables of a service provider system.

At step 424, the query is correlated to a query optimization rule based on query dimensions in the query. Using two or more dimensions identified in the query, the query optimization rules may be parsed and processed to identify one or more of such rules that are correlated with the query. For example, query optimization rules may designate a particular pre-aggregated data table to search if certain dimensions are found in a query, and may further designate the number of required matching dimensions, order, scope, or range of such dimensions, and other parameters of the dimensions in the query. The query may match multiple rules, and multiple tables, and therefore a best matching rule (e.g., highest number of matching dimensions) may be selected, or another rule metric may be used, such as a most commonly used query optimization rule, a newest or older rule, etc. However, in other embodiments, all matching rules may be used.

At step 426, a pre-aggregated data table in an online query optimization system is determined based on the query optimization rule. The query optimization system may include multiple pre-aggregated data tables, and one or more may be selected for searching based on the query optimization rules correlated to the received query. Using the correlated rules, corresponding data tables for pre-aggregated data may be identified. As such, at step 428, the pre-aggregated data table for the data is queried based on the query dimensions. Querying of the pre-aggregated data table may include performing searching and/or lookups using the query and/or dimensions of the query once the pre-aggregated data table(s) to be searched are identified. As such, a data lookup and retrieval process for query resolution may be performed for the query with the pre-aggregated data table in place of querying a separate database system and/or storage component, as well as larger data tables that may be stored in slower or more remote data storage.

At step 430, a response is returned to the query from the data table without querying the database system. The response may be returned to the requesting client such that a user interface, dashboard, or the like is updated with a response and output to the input query. However, by querying the pre-aggregated data tables in place of larger data tables and/or large database systems, the response may be returned more quickly and efficiently through searching smaller and more local data tables. As such, the user may view a metric, result, or other output from a query in an interface or dashboard in a faster manner without requiring a service provider system to query one or more separate and/or remote database systems and storage components.

Figure 5:
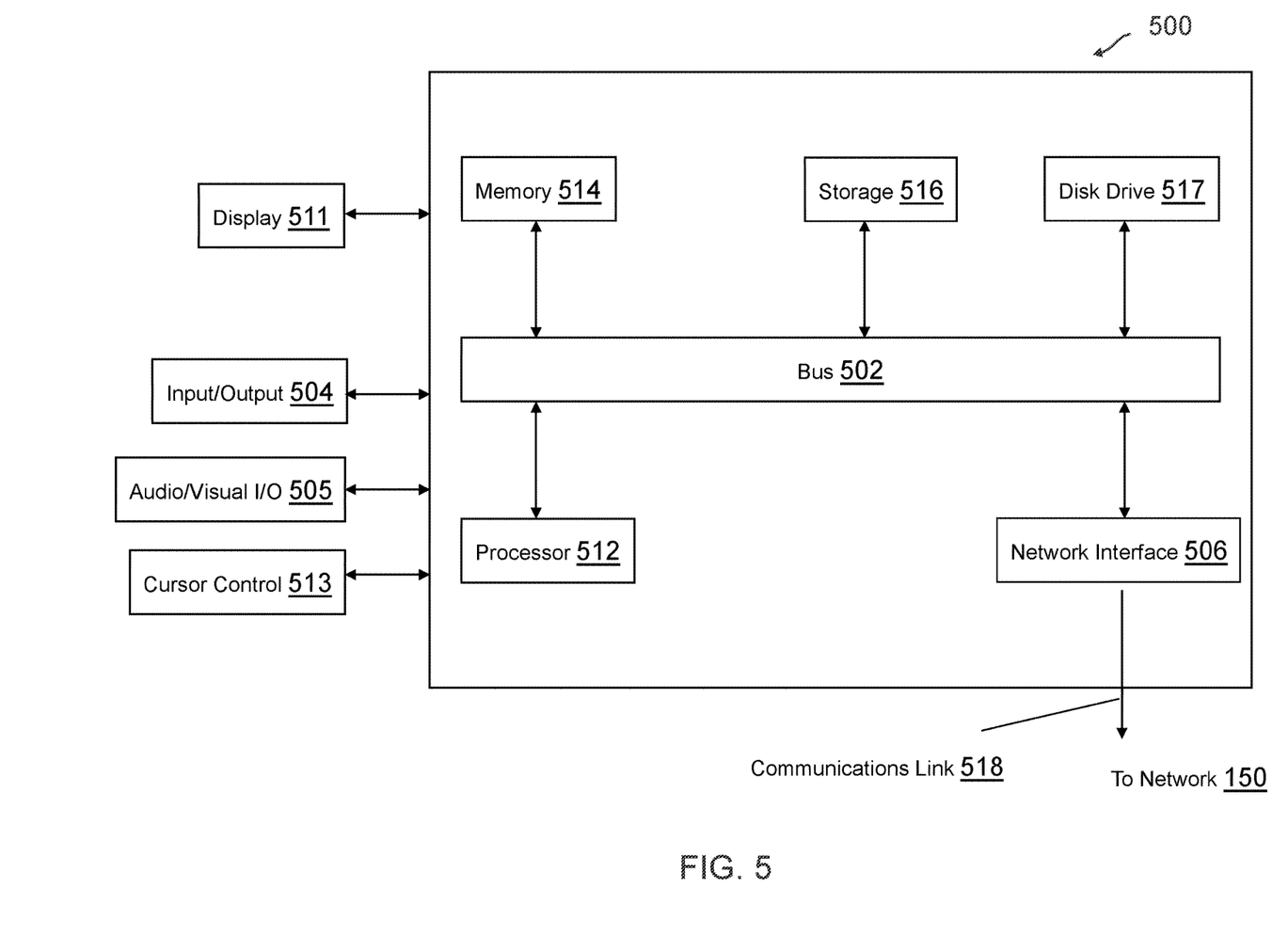
FIG. 5 is a block diagram of a computer system suitable for implementing one or more components in FIG. 1, according to an embodiment.

FIG. 5 is a block diagram of a computer system suitable for implementing one or more components in FIG. 1, according to an embodiment. In various embodiments, the communication device may comprise a personal computing device e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another communication device, service device, or a service provider server via network 150. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A method comprising:
    receiving a query comprising at least two dimensions for data from a database system, wherein the database system comprises a plurality of separate data storages each having a separate query structure and a separate storage format;
    correlating the query to a plurality of query optimization rules associated with a plurality of data tables that have been pre-aggregated from the data in the database system, wherein the data is pre-aggregated in the data tables based on query patterns and a plurality of pre-computation rules for pre-aggregating the data based on the query patterns;
    determining a data table, from the plurality of data tables, corresponding to the query based on the correlating, wherein the data table comprises the data pre-aggregated from the database system based on previously querying the database system for the data using the at least two dimensions;
    executing the query of the data table based on the at least two dimensions; and
    returning a response to the query from the data table without querying the database system.

2. The method of claim 1, wherein, prior to the receiving the query, the method further comprises:
    generating the data tables and the plurality of query optimization rules based on the plurality of precomputation rules.

3. The method of claim 2, wherein the generating the data tables are triggered based on a periodic job executed by a log analysis system that matches the query patterns to the plurality of precomputation rules.

4. The method of claim 1, wherein the plurality of precomputation rules are established for an offline aggregation of the data from the plurality of separate data storages using each of the separate query structures and the separate storage formats, and wherein the plurality of query optimization rules are established for online optimization of at least query response times using at least the data table independent of querying each of the plurality of separate data storages.

5. The method of claim 1, wherein prior to the receiving the query, the method further comprises:
    determining a precomputation rule for creating the data table based on the at least two dimensions;
    accessing query patterns associated with the at least two dimensions;
    determining that the query patterns include a threshold number of queries matching the precomputation rule;
    aggregating the data from the database system; and
    creating the data table for the data based on the aggregating.

6. The method of claim 5, wherein the data table is created with metadata for the data table that is used to query the data table and the database system for the data.

7. The method of claim 5, further comprising:
    associating, in a data catalog, the data table with one or more sources of the data from the database system.

8. The method of claim 7, further comprising:
    maintaining the data catalog having a plurality of associations between different data tables and a plurality of sources available from the database system.

9. The method of claim 5, wherein the precomputation rule is established for an offline precomputation component that generates the data table in an offline environment, and wherein the plurality of query optimization rules are established for an online query optimization component that processes the query with the data table in an online environment.

10. A system comprising:
    a non-transitory memory; and
    one or more hardware processors coupled to the non-transitory memory and configured to execute instructions to cause the system to:
        receive a query for data from at least one of a plurality of data storages separate from the system;

determine at least two dimensions in the query that are associated with parameters having values in data tables stored by the plurality of data storages;

determine a pre-aggregated data table corresponding to the data based on the at least two dimensions and a query optimization rule that routes queries to the pre-aggregated data table when the at least two dimensions are detected in the queries, wherein the pre-aggregated data table is accessible without querying the at least one of the plurality of data storages for the data;

execute the query of the data table based on the at least two dimensions; and return a response to the query from the data table without querying the data storages.

11. The system of claim 10, wherein the pre-aggregated data table is one of a plurality of pre-aggregated data tables generated using precomputation rules using an offline precomputation component of the system.

12. The system of claim 11, wherein, prior to receiving the query, executing the instructions further causes the system to:

trigger a processing job to generate the pre-aggregated data tables based on at least one of the precomputation rules or query patterns detected for queries received by the system.

13. The system of claim 10, wherein the query optimization rule is established for online optimization of at least query response times using at least the data table independent of querying each of the plurality of separate data storages.

14. The system of claim 10, wherein, prior to the receiving the query, executing the instructions further causes the system to:

identify query patterns in the queries received by the system over a time period;

determine that the query patterns include a threshold number of queries having the at least two dimensions based on a precomputation rule; and aggregate the data in the data table from the at least one of the plurality of data storages.

15. The system of claim 14, wherein executing the instructions further causes the system to:

generate metadata including a mapping of the data in the pre-aggregated data table to the at least one of the plurality of data storages; and store the metadata in a data catalog system accessible by a client transmitting the query.

16. The system of claim 15, wherein the mapping is provided with the response to the client.

17. The system of claim 10, wherein the pre-aggregated data table is stored in an online server storage accessible in an online computing environment that processed the query.

18. The system of claim 10, wherein the at least two dimensions are associated with separate data parameters in the pre-aggregated data table having values for different data records.

19. A non-transitory machine-readable medium having stored thereon machine-readable instructions executable to cause a machine to perform operations comprising:

receiving a query comprising at least two dimensions for data from a database system having a plurality of separate data storage components;

determining, based on a query optimization rule, a pre-aggregated data table storing the data in place of the database system, wherein the pre-aggregated data table is accessible independent of querying one or more of the plurality of separate data storage components;

querying the data table for the data based on the query and the at least two dimensions; and retrieving, based on the querying, the data from the data table independent of querying one or more of the plurality of separate data storage components.

20. The non-transitory machine-readable medium of claim 19, wherein the query optimization rule is procedurally generated by a precomputation system based on the at least two dimensions and an aggregation of the data from the database system.

* * * * *